(12) United States Patent
Litzinger

(10) Patent No.: US 10,865,824 B1
(45) Date of Patent: *Dec. 15, 2020

(54) MUSHROOM-COMPACTION AND ASYMMETRIC-THREAD IMPACT-DRIVABLE SCREW

(71) Applicant: W. C. Litzinger, Springdale, AR (US)

(72) Inventor: W. C. Litzinger, Springdale, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/266,406

(22) Filed: Feb. 4, 2019

Related U.S. Application Data

(63) Continuation-in-part of application No. 15/070,316, filed on Mar. 15, 2016, now Pat. No. 10,197,085, which is a continuation-in-part of application No. 14/189,551, filed on Feb. 25, 2014, now Pat. No. 9,291,183, which is a continuation-in-part of application No. 12/807,500, filed on Sep. 27, 2010, now abandoned, which is a continuation-in-part of application No. 11/725,967, filed on Mar. 20, 2007, now abandoned.

(60) Provisional application No. 60/790,501, filed on Apr. 7, 2006, provisional application No. 60/854,884, filed on Oct. 27, 2006.

(51) Int. Cl.
| | |
|---|---|
| *F16B 15/00* | (2006.01) |
| *F16B 25/00* | (2006.01) |
| *F16B 15/08* | (2006.01) |
| *F16B 25/10* | (2006.01) |
| *F16B 15/06* | (2006.01) |

(52) U.S. Cl.
CPC .......... *F16B 25/0042* (2013.01); *F16B 15/08* (2013.01); *F16B 15/06* (2013.01); *F16B 25/106* (2013.01)

(58) Field of Classification Search
CPC .......... F16B 15/06; F16B 19/04; F16B 33/02; F16B 25/106
USPC .................. 411/453, 493, 498, 414
See application file for complete search history.

(56) References Cited

U.S. PATENT DOCUMENTS

| | | |
|---|---|---|
| 71,166 A | 11/1867 | Harvey |
| 108,986 A | 11/1870 | Dunn |
| 137,414 A | 4/1873 | Burdick |
| 221,729 A | 11/1879 | Harvey |
| 276,541 A | 4/1883 | Sloan |
| 313,078 A | 3/1885 | Jones |
| 327,296 A | 9/1885 | McGinnis |
| 338,956 A | 3/1886 | Hall |
| 355,825 A | 1/1887 | Jones |

(Continued)

FOREIGN PATENT DOCUMENTS

| | | |
|---|---|---|
| DE | 2710240 A1 | 9/1978 |
| DE | 20214686 U1 | 2/2003 |

(Continued)

*Primary Examiner* — Flemming Saether
(74) *Attorney, Agent, or Firm* — Keisling & Pieper PLC; David B. Pieper; Trent C. Keisling

(57) ABSTRACT

An asymmetric thread impact drivable screw and clip for use with a power impact device for penetrating wood fibers while minimizing cut fibers. The screw includes an impact head and a conical shaped tip having a ballistic insertion angle at the ends of a shank. The shank defines asymmetrical threads with an insertion flank having a long side at a slide angle peaking at a crest supported by a catch flank positioned at a grip angle. Varying tool accepting recess are taught for the head along with multiple thread sections. A mushroom compaction thread section is also taught.

12 Claims, 4 Drawing Sheets

(56) References Cited

U.S. PATENT DOCUMENTS

| | | | |
|---|---|---|---|
| 364,300 A | 6/1887 | Rogers | |
| 364,301 A | 6/1887 | Rogers | |
| 368,687 A | 8/1887 | Rogers | |
| 426,008 A | 4/1890 | Groff | |
| 471,179 A | 3/1892 | Jones | |
| 676,240 A | 6/1901 | Latty | |
| 1,326,910 A | 1/1920 | Butterfield | |
| 1,891,895 A | 12/1932 | Nagel | |
| 1,912,222 A | 5/1933 | Rosenberg | |
| 1,953,592 A | 4/1934 | Deniston, Jr. | 85/28 |
| 2,001,869 A | 5/1935 | Deniston, Jr. | 10/10 |
| 2,046,837 A | 7/1936 | Phillips | 145/50 |
| 2,075,411 A | 3/1937 | Von Mertens | 85/44 |
| 2,093,610 A | 9/1937 | Kraemer | 85/21 |
| 2,140,014 A | 12/1938 | Iasillo | 306/30 |
| 2,174,578 A | 10/1939 | Graham | 85/44 |
| 2,190,883 A | 2/1940 | Pauze | 85/21 |
| 2,226,006 A | 12/1940 | Maze | 85/28 |
| 2,242,758 A | 5/1941 | Ruggieri | 85/46 |
| 2,269,708 A | 1/1942 | Dickson | 85/20 |
| 2,558,379 A | 6/1951 | Phipard | 85/20 |
| 2,605,867 A | 8/1952 | Goodwin | 189/37 |
| 2,967,448 A | 1/1961 | Hallock | 85/21 |
| 3,010,353 A | 11/1961 | Psaros | 85/21 |
| 3,019,460 A | 2/1962 | Corckran | 10/54 |
| 3,056,234 A | 10/1962 | Nelsson et al. | 50/319 |
| 3,204,516 A | 9/1965 | Wieber | 85/41 |
| 3,827,131 A | 8/1974 | Coltrin | 29/432.1 |
| 3,850,073 A | 11/1974 | Hayes | 85/20 |
| 3,861,527 A | 1/1975 | Perkins | 206/344 |
| 3,861,529 A | 1/1975 | Coleman | 206/471 |
| 3,977,142 A | 8/1976 | Dove et al. | 52/363 |
| 4,572,720 A | 2/1986 | Rockenfeller et al. | 411/387 |
| 4,718,802 A | 1/1988 | Rockenfeller et al. | 411/421 |
| 4,932,820 A | 6/1990 | Schniedermeier | 411/455 |
| 5,375,957 A | 12/1994 | Golledge | 411/453 |
| 5,489,179 A | 2/1996 | Gabriel et al. | 411/453 |
| 5,741,104 A | 4/1998 | Lat et al. | 411/453 |
| 6,022,177 A | 2/2000 | Hofer | 411/412 |
| 6,074,149 A | 6/2000 | Habermehl et al. | 411/442 |
| 6,666,638 B2 | 12/2003 | Craven | 411/413 |
| 6,941,635 B2 | 9/2005 | Craven | 29/525.11 |
| 9,291,183 B2 | 3/2016 | Litzinger | 411/453 |
| 10,197,085 B1 | 2/2019 | Litzinger | 411/453 |
| 2007/0258794 A1 | 11/2007 | Litzinger | 411/442 |
| 2012/0096701 A1 | 4/2012 | Schachner | 29/432 |

FOREIGN PATENT DOCUMENTS

| | | |
|---|---|---|
| EP | 129404 A1 | 6/1984 |
| WO | WO03014578 A2 | 8/2002 |

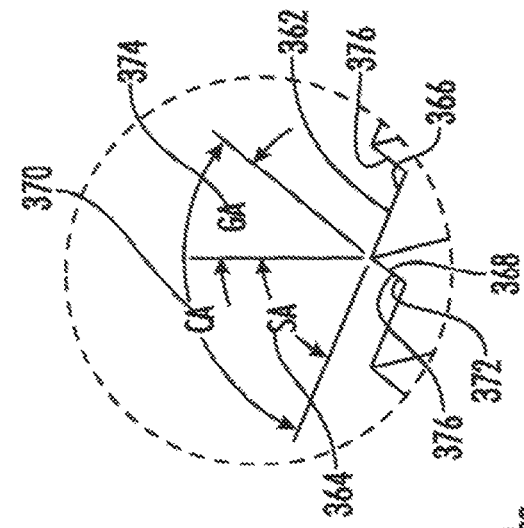
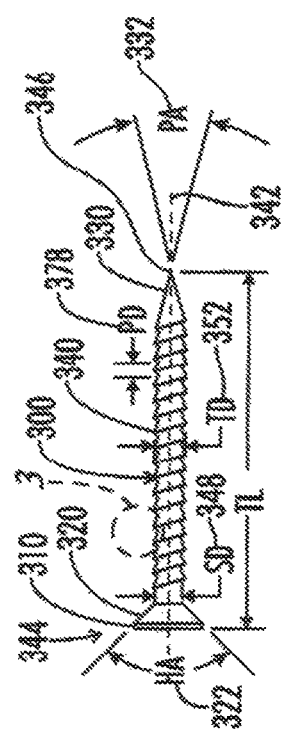
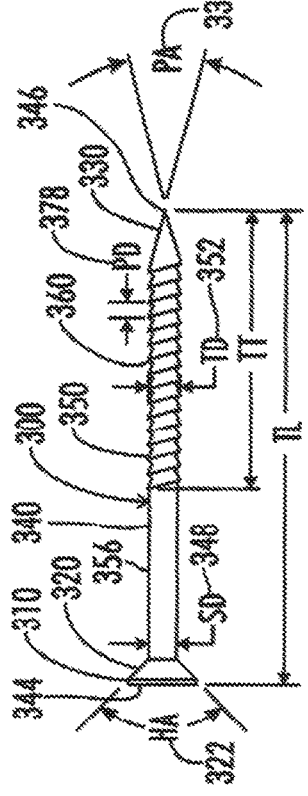
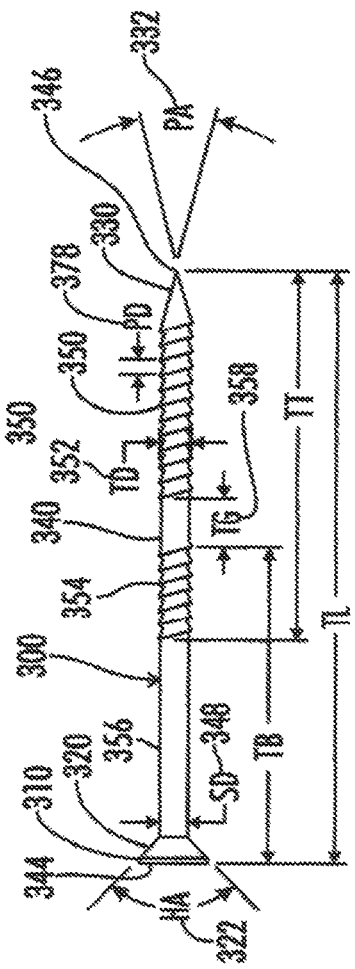
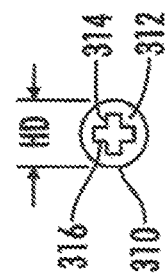
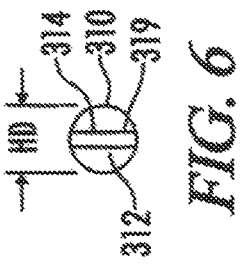

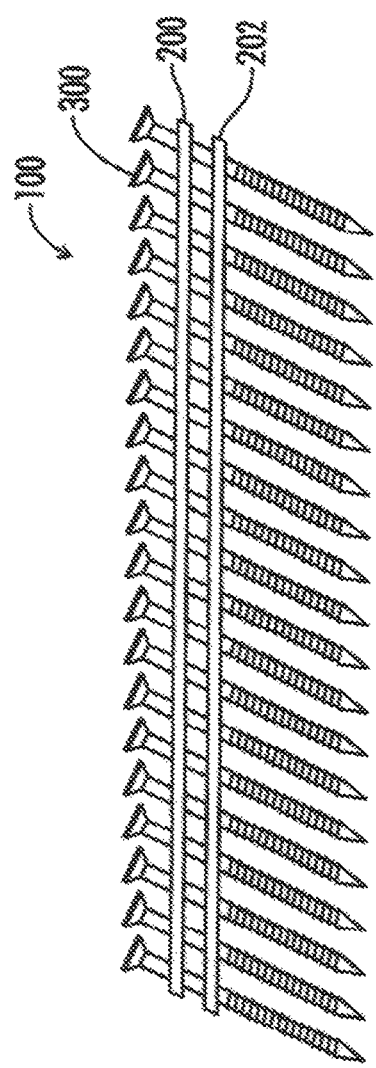
FIG. 8
FIG. 9
FIG. 10
FIG. 11
FIG. 12
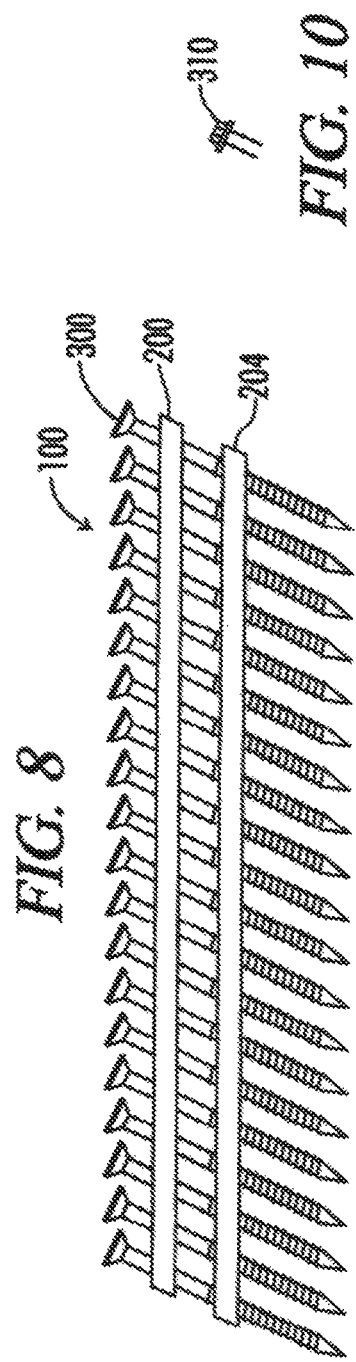
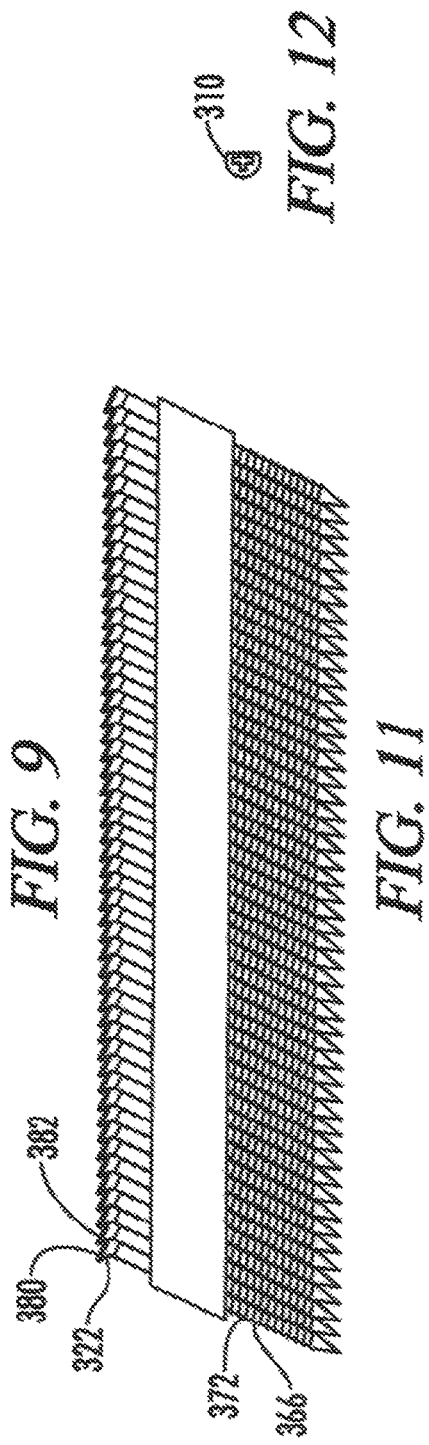

MUSHROOM-COMPACTION AND ASYMMETRIC-THREAD IMPACT-DRIVABLE SCREW

CROSS-REFERENCE TO RELATED APPLICATIONS

This application claims priority to and is a continuation-in-part of U.S. patent application Ser. No. 15/070,316, filed on Mar. 15, 2016 entitled Mushroom-Compaction and Asymmetric-Thread Impact-Drivable Screw, which claims priority to and is a continuation-in-part of U.S. patent application Ser. No. 14/189,551, filed on Feb. 25, 2014 entitled Mushroom-Compaction and Asymmetric-Thread Impact-Drivable Screw, which claims priority to and is a continuation-in-part of U.S. patent application Ser. No. 12/807,500, filed on Sep. 27, 2010 entitled Mushroom-compaction Asymmetric-Thread Impact-Drivable Screw which is a continuation in part of U.S. patent application Ser. No. 11/725,967, filed on Mar. 20, 2007, which is a continuation in part of both U.S. Provisional Application Ser. No. 60/790,501 filed by Litzinger on Apr. 7, 2006 entitled Asymmetric Thread Impact Drivable Screw and U.S. Provisional Application Ser. No. 60/854,884 filed by Litzinger on Oct. 27, 2006 entitled Mushroom-compaction Asymmetric-Thread Impact-Drivable Screw which are all hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of impact driveable screws. In particular, the present invention relates specifically to an asymmetric thread screw having a ballistic point for use with impact drivers along with a high degree crest angle forming a long surface area slide flank and a short surface area grip flank to reduce fiber cutting during impact insertion of the screwnail. A secondary mushroom compaction thread is also disclosed.

2. Description of the Known Art

As will be appreciated by those skilled in the art, symmetrical thread screws, self drilling screws, and screws with cutting points have been known for an extended period of time. Present construction techniques use screws with a cutting or self tapping head that are rotated into a material to connect different materials together. This is very time consuming because of the extended time period it takes to rotate the screw into the material.

Other techniques use a combination of glue and regular nails in an attempt to achieve a similar holding power to the rotated screws. This creates a permanent attachment that cannot be disassembled. Similarly, the use of regular nails creates a strong bind that is difficult if not impossible to disassemble.

HITACHI has recently attempted impact driving screws with prior art type screw designs using a cutting point and a sharp angled thread on a wide thread pitch. These screws rip and tear the wood fibers during installation. See http://www.hitachipowertools.com for the limited information on their design.

Patents disclosing information relevant to screws include: United States Patent No. 137,414, issued to Burdick on Apr. 1, 1873; United States Patent No. 276,541, issued to Sloan on Apr. 24, 1883; United States Patent No. 327,296, issued to McGinnis on Sep. 29, 1885; United States Patent No. 373,074, issued to Jones on Nov. 15, 1887; United States Patent No. 426,008, issued to Groff on Apr. 22, 1890; United States Patent No. 471,179, issued to Jones on Mar. 22, 1892; United States Patent No. 676,240, issued to Latty on Jun. 11, 1901; U.S. Pat. No. 1,326,910, issued to Butterfield on Jan. 6, 1920; U.S. Pat. No. 1,891,895, issued to Nagel on Dec. 20, 1932; U.S. Pat. No. 1,912,222, issued to Rosenberg on May 30, 1933; U.S. Pat. No. 1,953,592, issued to Deniston on Apr. 3, 1934; U.S. Pat. No. 2,001,869, issued to Deniston on May 21, 1935; U.S. Pat. No. 2,046,837, issued to Phillips on Jul. 7, 1936; U.S. Pat. No. 2,075,411, issued to Mertens on Mar. 30, 1937; U.S. Pat. No. 2,093,610, issued to Kraemer on Sep. 21, 1937; U.S. Pat. No. 2,190,883, issued to Pauze on Feb. 20, 1940; U.S. Pat. No. 2,269,708, issued to Dickson on Jan. 30, 1942; U.S. Pat. No. 2,558,379, issued to Phipard on Jun. 26, 1951; U.S. Pat. No. 2,605,867, issued to Goodwin on Aug. 5, 1952; U.S. Pat. No. 2,967,448, issued to Hallock on Jan. 10, 1961; U.S. Pat. No. 3,010,353, issued to Psaros on Nov. 28, 1961; U.S. Pat. No. 3,019,460, issued to Corckram on Feb. 6, 1962; U.S. Pat. No. 3,056,234, issued to Nelsson et al. on Oct. 2, 1962; U.S. Pat. No. 3,204,516, issued to Wieber on Sep. 7, 1965; U.S. Pat. No. 3,850,073, issued to Hayes on Nov. 26, 1974; U.S. Pat. No. 3,861,527, issued to Perkins on Jan. 21, 1965; U.S. Pat. No. 3,977,142, issued to Dove et al. on Aug. 31, 1976; U.S. Pat. No. 4,572,720, issued to Rockenfeller et al. on Feb. 25, 1986; U.S. Pat. No. 4,718,802, issued to Rockenfeller, et al. on Jan. 12, 1988; U.S. Pat. No. 4,932,820, issued to Schniedermeier on Jun. 12, 1990; U.S. Pat. No. 5,375,957, issued to Golledge on Dec. 27, 1994; and U.S. Pat. No. 5,741,104, issued to Lat et al. on Apr. 21, 1998. Each of these patents is hereby expressly incorporated by reference in its entirety. These prior art references teach that screws should cut the wood fibers with a cutting or pyramid shaped point during insertion. Thus, it may be seen that these prior art patents are very limited in their teaching and utilization, and an improved impact driveable screwnail is needed to overcome these limitations.

SUMMARY OF THE INVENTION

The present invention is directed to an improved screw nail. In accordance with one exemplary embodiment of the present invention, an asymmetric thread impact drivable screw is provided using an impact head and a conical shaped tip having a ballistic insertion angle formed on the ends of a shank defining an axis. Of particular note is the use of the ballistic tip with the shank defining asymmetrical threads. The ballistic tip and the threads have a unique shape adapted for dividing the wood fibers while minimizing the cutting or breakage of the wood fibers. The thread has an insertion flank protruding from the shank at slide angle to push the fibers aside and allow for penetration of the wood without cutting the fibers. The slide angle has a long surface area leading to a crest that is supported on the back side by a catch flank. The catch flank is protruding from the shank at an impact supporting grip angle that provides the necessary support to the crest during impact insertion while still providing increased gripping strength when compared to bare nail shanks.

In another embodiment, the screws nails are collated into a clip for use with an impact fastener such as a pneumatic or gas operated nail gun.

In yet a further embodiment, the use of mushroom compaction threads are also disclosed.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a top view of a screwnail showing a Phillips head.

FIG. 2 is a side view of a screwnail showing the ballistic point and unique thread configuration.

FIG. 3 is an enlarged view of the unique thread configuration showing the elongated slide flank and the crest angle supported by the grip flank.

FIG. 4 is a top view of a screwnail showing a square drive head.

FIG. 5 is a side view of a screwnail showing the ballistic point, non-threaded shaft section and unique thread configuration.

FIG. 6 is a top view of a screwnail showing a slot head.

FIG. 7 is a side view of a screwnail showing the ballistic point, non-threaded shaft section and multiple thread sections.

FIG. 8 is a side view of a screwnail clip showing wire collating strips connecting multiple asymmetric thread screws using the unique thread configuration.

FIG. 9 is a side view of a screwnail clip showing plastic collating strips connecting multiple asymmetric thread screws using the unique thread configuration.

FIG. 10 is a side view of a screwnail showing a raised hex head.

FIG. 11 is a side view of a screwnail clip showing a paper collating strips connecting multiple asymmetric thread screws in a clipped head configuration.

FIG. 12 is a top view of a screwnail showing a clipped phillips head.

DETAILED DESCRIPTION OF THE INVENTION

Figure 13:
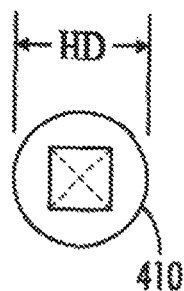
FIG. 13 is a top view of a screwnail showing a square drive head.

As shown in FIGS. 8 and 9 of the drawings, exemplary embodiments of the present invention are generally shown as an asymmetric thread impact drivable screw clips 100 having asymmetric thread impact drivable screws 300 connected by a collating strip 200. The collating strip 200 may be made from any conventional material including wire, paper, plastics, epoxies, or other known materials and is typically made from a wire 202 as shown in FIG. 8, or a plastic strip 204 as shown in FIG. 9. Strips, sheets, lines, and other known collating schemes may be used with the present invention. Alternative embodiments may include coiled strips, ratcheting strips, or other constructions.

As shown in FIGS. 1 through 9, the asymmetric thread impact drivable screw 300 has an impact head 310 with a top surface 312 having a head diameter HD defining a tool receiving recess 314. The counter sunk head shown is the preferred design, although any of the other head types may be implemented if it is compatible with the type of impact tool being utilized. FIG. 1 shows a number two phillips aperture 316, FIG. 4 shows a number two square aperture 318, and FIG. 6 shows a slot aperture 319 which are the preferred shapes. Any type of tool receiving recess or bolt head design may be used that will fit in the area of top surface 312 and this design aspect will be dependent upon the contact head inside the impact driver. Most impact drivers use a flat driving hammer such that the design of the impact head may be varied according to the application.

For the preferred embodiment, the impact head 310 is connected with a tapered neck.320 to the shank 340. The tapered neck has a head neck angle HA 322 used for the countersinking of the impact head 310 to the surface of the material that the screwnail is being used to secure.

The opposite end of the shank 340 ends in a conical shaped tip 330 using a ballistic insertion point angle PA 332. The present invention teaches a unique distinction over the prior art teaching of diamond or cutting shaped screw point because a ballistic tip 330 is used to separate fibers with minimal or no cutting of the wood fibers. This allows the present invention to work in a variety of situations, including but not limited to wood to wood, wood to light guage steel, drywall to wood, drywall to steel, foam to wood, foam to steel, subfloor attachment, roof deck attachment, siding attachment, concrete board attachment, fiberboard attachment, fencing applications, deck boards, framework, crating construction, pallet construction, soffit installation, concrete forms and other assemblies.

The shank 340 defines a central axis 342 running from the head end 344 to the tip end 346. The distance form the top of the impact head 310 to the bottom of the tip 330 is shown as the total length TL. The shank 340 defines a shank diameter SD 348 has at least a first threaded section 350 defining a major thread diameter TD 352. Multiple thread sections may be used as shown by the second threaded section 354 where the first section 350 and the second section 354 are separated by a thread gap TG 358. The top of the first thread is shown as the top thread TT measurement in FIGS. 5 and 7. The bottom of the first thread is shown as the thread bottom TB measurement in FIG. 7. The shank 340 may also define a non-threaded shank section 356.

A key aspect to the present invention is the use of the ballistic point 330 to separate the wood fibers along with the use of asymmetrical threads 360 using a low angle thread pitch 378 which passes the wood fibers with minimal or no tearing of the wood fibers. The asymmetric thread design and the fine thread shown by the pitch depth PD of the present invention keeps the wood fibers spread during insertion of the fastener without the large movements caused by changes between the maximum thread diameter and the root diameter of the thread. Thus, the relative high insertion speed consistency of the external shape of the present invention minimizes the cutting of the wood fibers during installation. The insertion without cutting is provided by a slide insertion flank 362 oriented at a slide angle SA 364 with a long slide surface 366 leading to the crest 368. The slide angle SA is shown in FIG. 3 as measured from a perpendicular line to the axis. This allows the wood fibers to be moved to the side without cutting into the fibers with the threads and the fine thread of the pitch depth keeps the fibers there without any substantial additional damage. Once the high speed insertion is stopped, the fibers will then close around the back side of the crest angle CA 370 and are caught by the grip catch flank 372 oriented at an impact supporting grip angle GA 374 providing a short catch surface 376. Note that the grip angle GA 374 must be chosen so that the grip catch flank 372 can provide the necessary strength to the crest 368 during the high impact forces of ballistic insertion while still providing an increased grip for the grip catch flank 372. This slide angle SA 364, grip angle GA 374 and crest angle CA 370 allow for increased holding power while minimizing or eliminating cutting of the wood fibers. The elongated nature of the wood fibers increases the holding power of the wood to screw connection to provide a superior product over previously known designs. A further advantage is provided by the fine thread and limited damage design of the present invention because removal of the screwnail leaves a smooth hole like a nail removal instead of a torn hole that is created by a prior art type of cutting screw. Typical design parameters are shown in the following table:

| | | Descr. | | |
|---|---|---|---|---|
| | | General | General Type | General |
| | | .113 (inch) * L | .120 (inch) * L | .131 (inch) * L |
| HD | Head diameter | 7.0 ± 0.15 mm | 7.0 ± 0.15 mm | 7.0 ± 0.15 mm |
| HA | Head Angle | 80° ± 2° | 80° ± 2° | 80° ± 2° |
| PA | Point angle | 28° ± 5° | 28° ± 5° | 28° ± 5° |
| TL | Length | L ± 1.27 mm | L ± 1.27 mm | L ± 1.27 mm |
| TB | First thread bottom * | Point | Point | Point |
| TG | Thread Gap ** | NA | NA | NA |
| TT | First Thread Top *** | 2/3 * L | 2/3 * L | 2/3 * L |
| PD | Pitch Distance | 1.59 ± 10% mm | 1.69 ± 10% mm | 1.69 ± 10% mm |
| SD | Shank Diameter | 2.87 ± 0.03 mm | 3.05 ± 0.03 mm | 3.33 ± 0.03 mm |
| TD | external thread diameter | 3.15 ± 0.05 mm | 3.43 ± 0.05 mm | 3.70 ± 0.05 mm |
| SA | Slide Angle | 70° ± 2° | 70° ± 2° | 70° ± 2° |
| GA | Grip Angle | 40° ± 2° | 40° ± 2° | 40° ± 2° |
| CA | Crest Angle | 110° ± 2° | 110° ± 2° | 110° ± 2° |
| | Head type | #2 phillips or square | #2 phillips or square | #2 phillips or square |
| | Material | c-1010 or 1022 steel | c-1010 or 1022 steel | c-1010 or 1022 steel |
| | Surface hardness | Hv450 Min | Hv450 Min | Hv450 Min |
| | Case Depth | 0.05 mm Min | 0.05 mm Min | 0.05 mm Min |
| | Bending angle | 12° Min | 12° Min | 12° Min |
| | Torsional Strength | 28 kg/cm Min | 35 kg/cm Min | 45 kg/cm Min |
| | Coating | 3 um | 3 um | 3 um |

\* measured from head
\*\* measured from first thread bottom to second thread top
\*\*\* measured from ballistic point The preferred embodiments use the following design parameters:

| | | | | Descr. | | | |
|---|---|---|---|---|---|---|---|
| | | Example | Example | Example Type | Example | Example | Example |
| | | .113 (inch) * 1.5 (inch) | .113 (inch) * 2.0 (inch) | .113 (inch) * 2.5 (inch) | 2.85 (inch) * 2 (inch) | 2.85 (inch) * 2.5 (inch) | 2.85 (inch) * 3 (inch) |
| HD | Head diameter | 6.83 ± 0.15 mm | 6.83 ± 0.15 mm | 6.83 ± 0.15 mm | 6.1 ± 1 mm | 6.1 ± 1 mm | 6.1 ± 1 mm |
| HA | Head Angle | 80° ± 2° | 80° ± 2° | 80° ± 2° | 80° ± 2° | 80° ± 2° | 80° ± 2° |

-continued

| | | Example .113 (inch) * 1.5 (inch) | Example .113 (inch) * 2.0 (inch) | Descr. Type Example .113 (inch) * 2.5 (inch) | Example 2.85 (inch) * 2 (inch) | Example 2.85 (inch) * 2.5 (inch) | Example 2.85 (inch) * 3 (inch) |
|---|---|---|---|---|---|---|---|
| PA | Point angle | 28° ± 5° | 28° ± 5° | 28° ± 5° | 28° ± 5° | 28° ± 5° | 28° ± 5° |
| TL | Length | 38.1 ± 1.27 mm | 57.15 ± 1.27 mm | 63.5 ± 1.27 mm | 57.15 ± 1.27 mm | 63.5 ± 1.27 mm | 76.2 ± 1.27 mm |
| TB | First thread bottom* | Point | 34.5 ± 1.0 mm | 34.5 ± 1.0 mm | Point | Point | Point |
| TG | Thread Gap** | NA | 5.0 ± 10.5 mm | 5.0 ± 0.5 mm | NA | NA | NA |
| TT | First Thread Top *** | Head | 35 ± 1.0 mm | 40 ± 1.0 mm | 30 ± 1.0 mm | 42 ± 1.0 mm | 42 ± 1.0 mm |
| PD | Pitch Distance | 1.59 ± 10% mm | 1.59 ± 10% mm | 1.59 ± 10% mm | 1.59 ± 10% mm | 1.59 ± 10% mm | 1.59 ± 10% mm |
| SD | Shank Diameter | 2.87 ± 0.03 mm | 2.87 ± 0.03 mm | 2.87 ± 0.03 mm | 2.87 ± 0.03 mm | 2.87 ± 0.03 mm | 2.87 ± 0.03 mm |
| TD | external thread diameter | 3.15 ± 0.05 mm | 3.15 ± 0.05 mm | 3.15 ± 0.05 mm | 3.15 ± 0.05 mm | 3.15 ± 0.05 mm | 3.15 ± 0.05 mm |
| SA | Slide Angle | 70° ± 2° | 70° ± 2° | 70° ± 2° | 70° ± 2° | 70° ± 2° | 70° ± 2° |
| GA | Grip Angle | 40° ± 2° | 40° ± 2° | 40° ± 2° | 40° ± 2° | 40° ± 2° | 40° ± 2° |
| CA | Crest Angle | 110° ± 2° | 110° ± 2° | 110° ± 2° | 110° ± 2° | 110° ± 2° | 110° ± 2° |
| | Head type | #2 phillips or square | #2 phillips or square | #2 phillips or square | #2 phillips or square | #2 phillips or square | #2 phillips or square |
| | Material | c-1010 or 1022 steel | c-1010 or 1022 steel | c-1010 or 1022 steel | c-1010 or 1022 steel | c-1010 or 1022 steel | c-1010 or 1022 steel |
| | Surface hardness | Hv450 Min | Hv450 Min | Hv450 Min | Hv450 Min | Hv450 Min | Hv450 Min |
| | Case Depth | 0.05 mm Min | 0.05 mm Min | 0.05 mm Min | 0.05 mm Min | 0.05 mm Min | 0.05 mm Min |
| | Bending angle | 12° Min | 12° Min | 12° Min | 12° Min | 12° Min | 12° Min |
| | Torsional Strength | 12 kg/cm Min | 12 kg/cm Min | 12 kg/cm Min | 12 kg/cm Min | 12 kg/cm Min | 12 kg/cm Min |
| | Coating | 3 um | 3 um | 3 um | 3 um | 3 um | 3 um |

*measured from head
**measured from first thread bottom to second thread top
***measured from ballistic point Obvious variations may be made to these examples, including varying the angles outside of these preferred parameters and changing thicknesses or types of coatings. For example, common requests for diameters of screws are 0.099, 0.100, and 0.105 inch diameter screws with varying lengths. Note that any type of coating may be used with this screw design including, galavanized coating, yellow zinc, paint, ceramic, concrete, etc. . . . . Thus, these examples are illustrative only and are not meant to limit the present invention. A further example of this variation is shown in FIGS. 10, 11, and 12.

FIG. 10 shows how the head 310 may be varied to use a hex head or socket type of driver similar to the common one-quarter inch hex drives used in various industries. FIG. 11, shows a paper collation used on a D-head shaped impact head. Note that the head angle 322 has been changed from the preferred embodiment's eighty degree angle to a curvature to accommodate the adjacent heads. Further note should be taken in FIG. 11 of the advantages provided by the slide 366 and grip 372 configuration. As noted by FIG. 11, when screws are placed into a tight configuration such as with a full head, offset head, or clipped head configuration, the threads on the shanks of the screws may contact due to mishandling of the screw strip on the job site. With the present invention's slide 366, the threads of the driven screw 380 will not catch the threads of the adjacent screw 382 remaining on the strip because the slide 366 will guide the driven screw 380 past the adjacent screw 382. FIG. 12 shows a top view of the d-shaped clipped head 310. Note that full head, offset head, or clipped heads may be utilized as appropriate. From this, it may be seen that many variations may be utilized with the advantages taught by the present invention.

Figure 14:
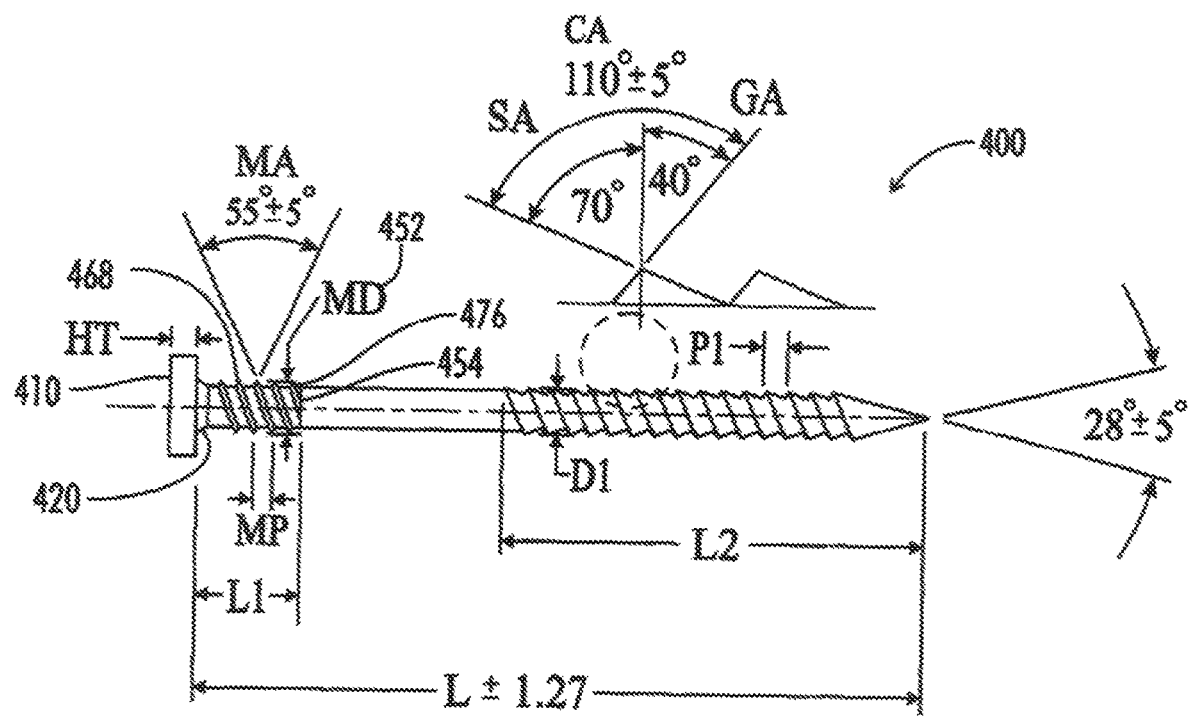
FIG. 14 is a side view of a screwnail showing the ballistic point, unique thread configuration, mushroom compaction threads, and driving head.
Figure 15:
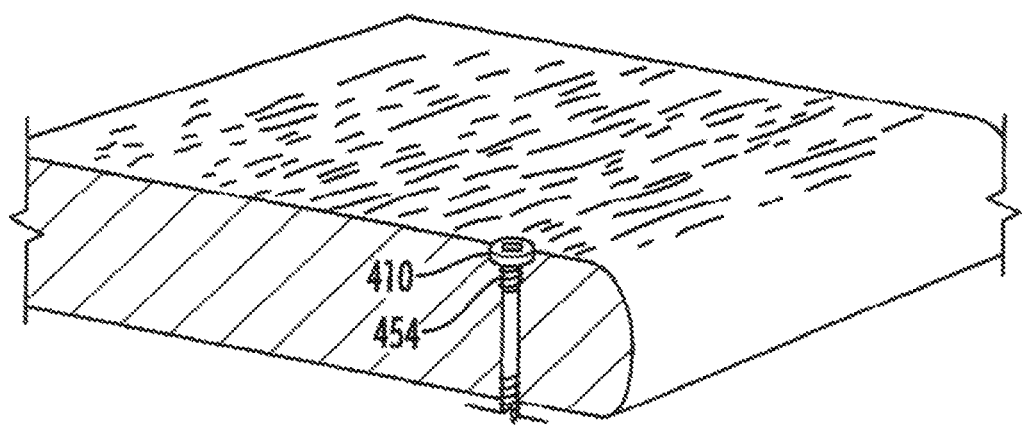
FIG. 15 is a cutaway view of a board with a mushroom compaction slide thread screwnail installed.
Figure 16:
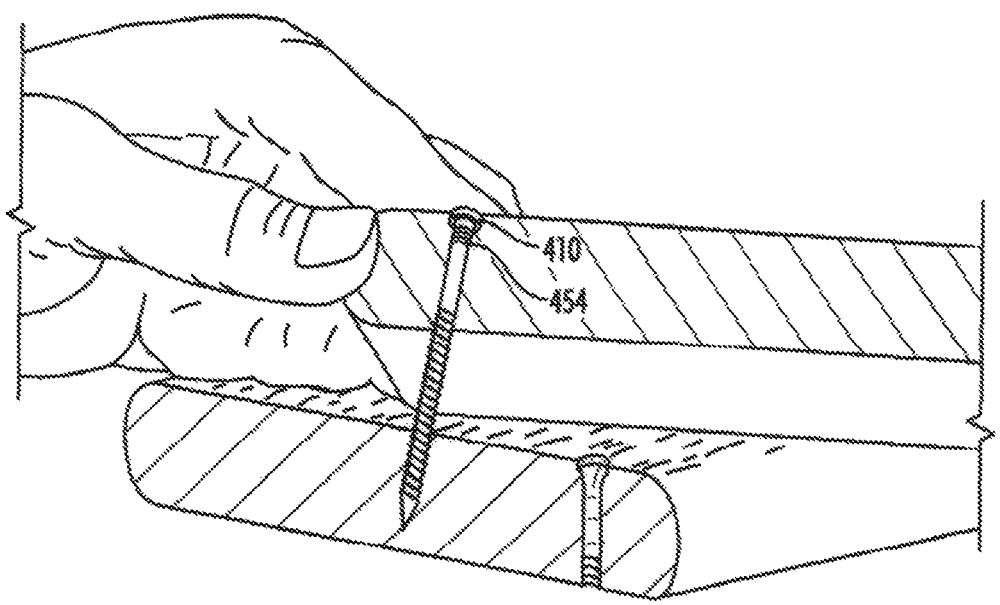
FIG. 16 is a cutaway view of a board with a mushroom compaction slide thread screwnail installed and showing the opposite side and the resulting hole in the composite.

FIGS. 13, 14, 15, and 16 show the top and side views of a mushroom compaction asymmetric thread impact drivable screw 400. This mushroom compaction screw 400 uses a mushroom compaction impact head 410 having a similar top surface 312 and tool receiving recess 314 that can define a phillips aperture 316, a square aperture 318, a slot aperture 319, or other appropriate tool connection shape. Instead of the tapered neck 320, the mushroom compaction head is almost a blunt connection using only a minimal neck fillet 420. This allows for the capturing of any mushrooming wood fibers without the redirecting that would be caused by the tapered neck 320. Once again, a conical shaped tip 330 is used with a ballistic insertion angle 332 on the end of the shank 340. The shank 340 again defines the central axis 342 and the head end 344 and the tip end 346. Note head that in addition to the shank diameter 348 and the first threaded section 350 with the major thread diameter 352, there is second threaded section 354 with mushroom compaction threads 454 having a mushroom compaction diameter 452. A non-threaded shank section 356 can still be used with a thread gap 358.

The mushroom compaction threads 454 use either asymmetric or symmetrical threads 360 with a gripping insertion flank 462 leading to a crest 468 with a corresponding grip catch flank 472. In this manner, both the first and second sides of the threads 454 have a short catch surface 476. This allows for any mushrooming effect from the hole to be caught by the insertion side of the mushroom compaction threads 454 and pulled down into the hole to leave a smooth surface on the board.

Dimensions for the preferred embodiment of the mushroom compaction asymmetric thread impact drivable screw 400 are as follows:

a tip end 346
a shank diameter 348
first threaded section 350
a major thread diameter 352
second threaded section 354
a non-threaded shank section 356
a thread gap 358
asymmetrical threads 360
a slide insertion flank 362
slide angle 364
a long slide surface 366
a crest 368
a crest angle 370
a grip catch flank 372
impact supporting grip angle 374
a short catch surface 376
thread pitch 378
driven screw 380

| Head | Size | HD | MP ± 10% | P1 ± 10% | MD | D1 | L1 | L2 | HT |
|---|---|---|---|---|---|---|---|---|---|
| #2 Sq. | .120 * L | 6.68~6.99 | 1.41 | 1.69 | 4.06~4.18 | 3.43 ± 0.05 | 5.5 ± 1.0 | 40 ± 2.0 | 2 ± 0.1 |

The overall crest angle from the mushroom threads is 55°±5° symmetrically divided and the overall length is 2.25 inches. The ballistic angle, crest angle, slide angle and grip angle are as previously described. The material is c-1018 or 1022 steel with a surface hardness of Hv450 minimum and a case depth of 0.05 mm minimum. The bending angle is 12° Min with a torsional strength of 35 kg/cm minimum. Note that the mushrooming threads are comparatively short in length in this application due to the minimal, if any, mushrooming associated with the slide angle type of threads. This allows for use of the impact screw with most nail guns by allowing the penetration and holding power to be developed by the sliding threads with only the slight amount of compression used by the limited mushroom controlling threads. This allows for screw applications with the mushrooming control while still working in the limited capabilities of common impact drivers.

Thus, it may be seen that the present invention provides an advantage over the prior by using a ballistic point in combination with a unique thread design that allows for insertion of the screwnails with minimal or no tearing of the wood fibers.

Reference numerals used throughout the detailed description and the drawings correspond to the following elements:
an asymmetric thread impact drivable screw clip 100
a collating strip 200
a wire 202
a plastic strip 204
an asymmetric thread impact drivable screw 300
an impact head 310
a top surface 312
a tool receiving recess 314
a phillips aperture 316
a square aperture 318
a slot aperture 319
a tapered neck. 320
a neck head angle 322
a conical shaped tip 330
a ballistic insertion angle 332
a shank 340
an axis 342
a head end 344
remaining screw 382
mushroom compaction asymmetric thread impact drivable screw 400
mushroom compaction impact head 410
neck fillet 420
mushroom compaction diameter 452
mushroom compaction threads 454
gripping insertion flank 462
crest 468
grip catch flank 472
short catch surface 476

From the foregoing, it will be seen that this invention is well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. An asymmetric thread impact drivable screw apparatus for use with a impact device, the apparatus comprising:

an impact head;

a conical shaped tip having a single constant ballistic insertion angle between twenty three degrees and thirty three degrees along the entire length of the conical shaped tip;

a shank defining an axis, the shank having a shank diameter, the shank having a first end connected to the impact head and a second end connected to the conical shaped tip, the shank defining a spiral of asymmetrical threads with an insertion flank peaking at a crest with the crest supported by a catch flank, the conical shaped tip extending to the crest defining a thread diameter larger than the shank diameter, the threads having a pitch distance and a thread diameter, the thread diameter being approximately twice the pitch distance;

the insertion flank protruding from the shank at slide angle; and the catch flank protruding from the shank at a grip angle of approximately forty degrees.

2. The apparatus of claim 1, the impact head comprising:
a top surface defining a tool receiving recess.

3. The apparatus of claim 2, the tool receiving recess defining a phillips aperture.

4. The apparatus of claim 2, the tool receiving recess defining a square aperture.

5. The apparatus of claim 1, the impact head connected to the first end of the shank by a tapered neck.

6. The apparatus of claim 5, the tapered neck defining a neck angle of eighty degrees.

7. The apparatus of claim 5, the tapered neck defining a neck angle between seventy eight degrees and eighty two degrees.

8. The apparatus of claim 1, the shank further defining mushroom compaction threads.

9. The apparatus of claim 1, the shank comprising:
a threaded shank section defining a major diameter; and
a non-threaded shank section defining a shank diameter, wherein the major diameter is larger than the shank diameter.

10. The apparatus of claim 9, wherein the major diameter is ten percent larger than the shank diameter.

11. The apparatus of claim 9, wherein the major diameter is up to twenty percent larger than the shank diameter.

12. The apparatus of claim 1, the shank having a plurality of distinct threaded sections.

* * * * *